United States Patent [19]

Clarke

[11] 4,394,888
[45] Jul. 26, 1983

[54] BRIDGING BAR ATTACHMENT MEANS FOR BI-ELEVATIONAL PLATFORM LIFT

[75] Inventor: David E. Clarke, St. Charles, Ill.

[73] Assignee: Advance Lifts, Inc., St. Charles, Ill.

[21] Appl. No.: 270,995

[22] Filed: Jun. 5, 1981

[51] Int. Cl.³ ............................................. B66B 9/00
[52] U.S. Cl. .................................... 187/1 R; 187/17; 14/71.1; 414/396
[58] Field of Search ................... 187/12, 17, 18, 1 R, 187/8.41; 14/71.3, 71.1, 71.7; 414/396, 401, 495

[56] References Cited

U.S. PATENT DOCUMENTS

| | | | |
|---|---|---|---|
| 3,122,764 | 3/1964 | Ambli | 14/71.3 |
| 3,539,067 | 11/1970 | Secrist | 414/495 |
| 3,715,769 | 2/1973 | Mori et al. | 14/71.1 |
| 3,982,295 | 9/1976 | Burnham | 14/71.3 |
| 4,221,280 | 9/1980 | Richards | 187/18 |

Primary Examiner—Joseph J. Rolla
Assistant Examiner—Thomas C. Fitzgerald
Attorney, Agent, or Firm—Lester N. Arnold

[57] ABSTRACT

Extendable bridging bar frame members are pivotally mounted to an angularly adjustable loading platform level of a bi-elevational platform lift apparatus. The bridging bar frame members are selectively extendable to engage an associated dock side loading surface in order to suspend a free end non-attached portion of the loading platform at dock side level while the opposite end portion of the loading platform is adjusted for alignment with a vertically offset dock side. This will allow angular adjustment of the loading platform level while still utilizing the mechanical support of the bridging bar frame members.

6 Claims, 6 Drawing Figures

BRIDGING BAR ATTACHMENT MEANS FOR BI-ELEVATIONAL PLATFORM LIFT

FIELD OF THE INVENTION

This invention relates to bi-elevational platforms or dock lifts vertically alignable with edges of loading docks, and more particularly, relates to bridging bar attachment means comprising a pair of extension bar members useful as attachment means to hang or suspend an associated platform from an adjacent edge of a loading level or dock.

BACKGROUND OF THE INVENTION

It is common practice in the pertinent art to provide a vertically adjustable scissor-type loading platform or dock lift which is more or less to be continually raised and lowered between an alignable dock level and a vertically offset cargo carrier bed such as a vehicle. In those instances wherein the loading platform of the dock lift can assume an inclined orientation, it is convenient to so align the platform surface to present an inclined ramp between two vertically offset levels, such as a vehicle to a loading dock or between two vehicles or two loading docks, etc. Such a platform lift apparatus has been previously patented as U.S. Pat. No. 4,221,280, and assigned to the same assignee as the present invention, wherein reference may be had thereto for further consideration.

In the present invention, an alternative structural means is implemented to provide the inclined ramp orientation for the platform surface of the same platform lift as described and disclosed in the referenced U.S. Pat. No. 4,221,280. Through employment of novel bridging bar attachment means to be connected to the platform structure of the dock lift and being pivotally connected thereto for assuming an outwardly extending orientation to bridge and attach to a vertically alignable dock side, the same inclined ramp orientation for the platform can readily be obtained by simply lowering the scissor-type platform structure whereupon the bridging bar attachment means including extension bar members are effective to engage the associated dock side and hang or suspend a free end non-attached portion of the upper platform level while the opposite end portion of the platform level is brought into horizontal alignment with another selected and vertically offset surface level. Hence, an associated undesirable repetition of vertical movement and adjustments can be conveniently eliminated through use of the present invention. Further, the angular oriented platform structure comprises a convenient loading ramp across which to move cargo.

SUMMARY OF THE INVENTION

In accordance with the present invention, bridging bar attachment means for use in combination with a vertically adjustable scissor-acting dock lift having a raised platform loading level which is free on one end portion thereof to be separated from the supporting frame structure, is comprised of a post member attachable to the platform loading level generally along the free end portion thereof and extending perpendicularly therefrom, a generally elongated bridging bar frame member pivotally connected to the post member on one end portion thereof and extending perpendicularly with respect thereto to define a free end portion of said bridging bar frame member, first restraining means for restraining the bridging bar frame member against pivotal movements with respect to the post member with the bridging bar in a first position extended outwardly from the platform loading level, second restraining means for restraining the bridging bar frame member from being disconnected from the post member with the bridging bar in a second position of non-extension from the platform loading level, and the free end portion of the bridging bar frame member including rounded and protruded surface means for engaging an associated adjacent loading level and maintaining uniform surface contact therewith during movement of the platform loading level with the bridging bar frame member restrained in the first position thereof.

It is therefore a primary object of the present invention to provide a simplified economical mechanical means for achieving the angular ramp-like orientation of a pivotal platform loading level.

It is another object to provide a mechanical bridging bar attachment means attachable to the free end portion of the pivotal platform level, and being movable to extend outwardly thereof for interconnecting engagement with a fixed and stationary loading level.

It is still another object to provide bridging bar frame means pivotally connected to the platform loading level by post means, wherein the frame means is to be restrained in a first fixed position by first restraining means against pivotal movements with respect to the post member.

It is yet another object to provide a rounded and protruded surface portion on the extended end portion of the bridging bar frame member to facilitate uniform engagement of the frame member with the surface of the fixed loading level as the free end portion of the platform level is suspended thereon and the fixed and opposite end thereof is lowered into alignment with an offset fixed loading level.

Other objects and advantages of the present invention shall be readily realized and appreciated from a consideration of the following description of the preferred embodiment with accompanying reference to the drawings, to wit:

DRAWING

DETAILED DESCRIPTION

Figure 1:
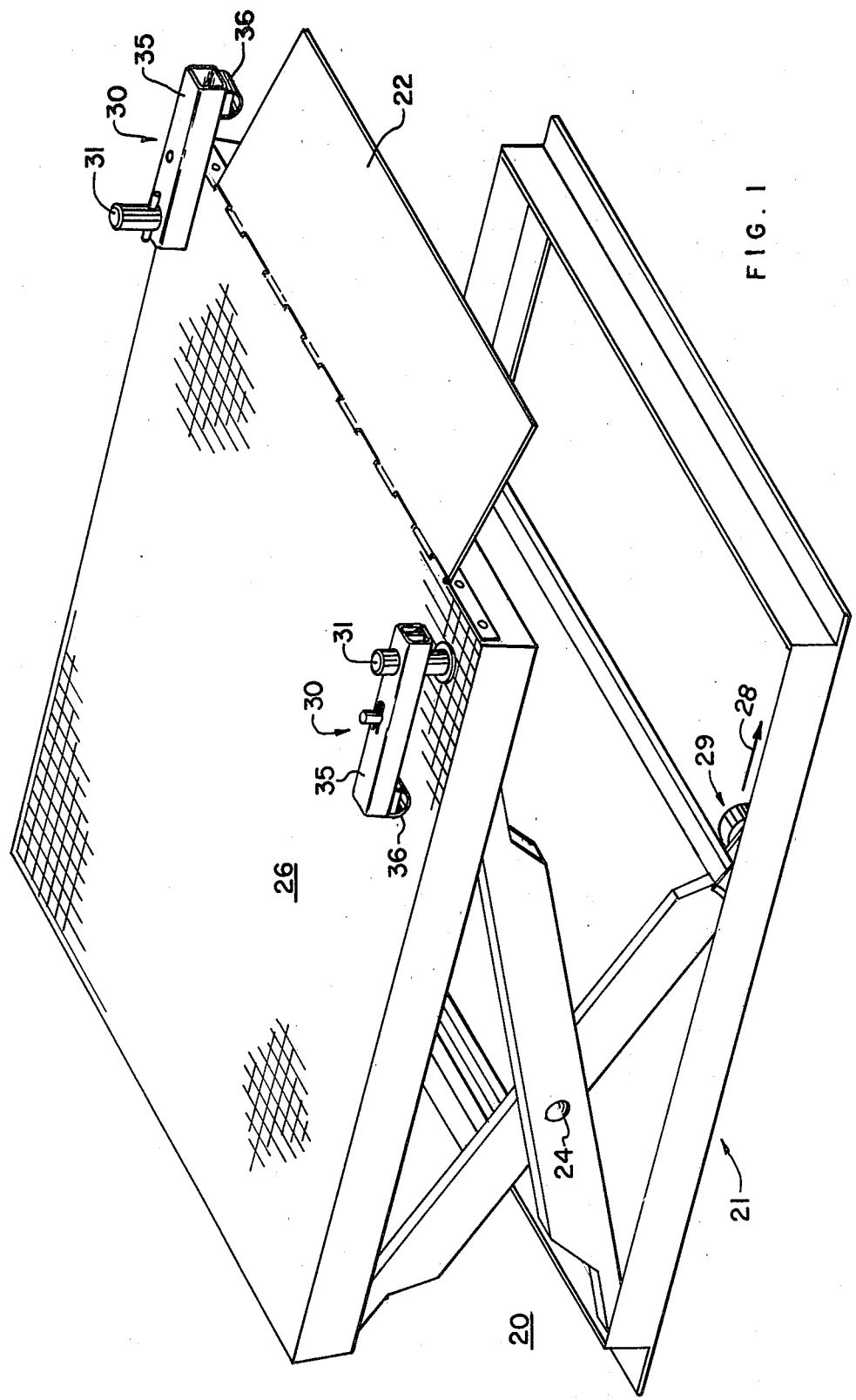
FIG. 1 is an enlarged frontal perspective view of a typical scissor-acting vertically adjustable platform loading dock or dock lift for use with the present invention, and showing the novel bridging bar attachment means mounted thereon in accordance with the preferred embodiment thereof.
Figure 2:
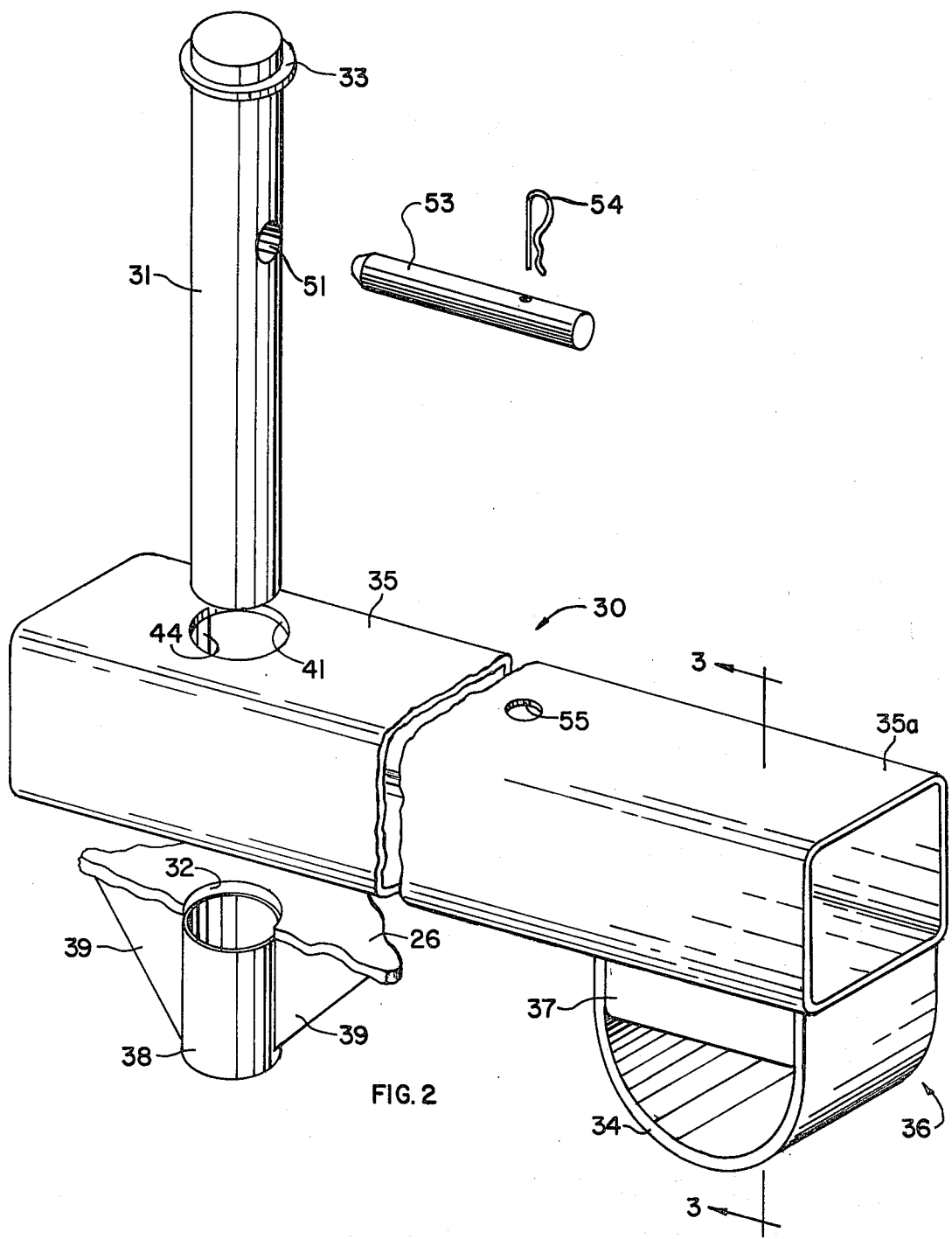
FIG. 2 is an enlarged fractional perspective view of a bridging bar attachment constructed in accordance with the present invention.

There is shown in FIG. 1 a typically configured bi-elevational platform lift apparatus or dock lift 20 including base frame means 21, scissor-acting intermediate frame support means 23 and a topmost platform loading level means 25 having a top surface 26 and attaching hinged flap member 22. The intermediate frame support member 23 is expandible or collapsible by hydraulic power means (not shown) to effect the scissor-acting movement obtained by means of the pivot axis provided at 24. The platform lift apparatus 20 is vertically adjustable to a fully closed or collapsed position corresponding to movement of the cross-arm 27 in the direction of the arrow 28 as shown in FIG. 1, as facilitated by roller means 29 (only one shown in the drawing) engagng the base frame means 21. The platform lift apparatus 20 is further adjustable to a vertically extended or fully open position corresponding to movement of the cross-arm 27 in the opposite direction from that shown by the arrow 28.

The operations of and the description of structure for the platform lift apparatus 20 of FIG. 1 can be readily appreciated from a consideration of the heretofore referenced U.S. Pat. No. 4,221,280. For a more detailed description to be included in this application, the same would not be in the interest of brevity and concise treatment, and is not deemed required for an enabling disclosure of the preferred embodiment of the present invention. Further, the controlled expansion and contraction action of the hydraulic power means with suitable actuators and controls by which to effect vertical lift and descent is thought to be well understood in the pertinent art, and a detailed description thereof is not deemed required to be set forth herein.

Again, with reference to FIG. 1, there is shown novel bridging bar attachment means 30 in accordance with the present invention and being shown mounted to the platform level 25, extended above the upper loading surface 26 thereof. A pair of such bridging means 30 is shown in FIG. 1, but it is convenient while sufficiently clear to describe only a single such bridging means 30. The bridging bar attachment means 30 includes a post member or post means 31 which is telescopically received or inserted into the platform level 25 by appropriate means to be described more fully hereinafter. With the platform level 25 being operated vertically while primarily extending in a horizontal plane, the post member 31 is extended vertically upwardly from the loading surface 26 to a predetermined height. There is shown a generally elongated bridging bar frame member 35, preferably of tubular rectangular frame construction, one end portion thereof which is to be received upon the post member 31 in pivotal connection therewith. The bridging bar frame member 35 is generally free to be moved circumferentially around the post member 31, and vertically with respect thereto. The frame member 35 includes on its distal or free end portion opposite of the pivotally connected end portion, a rounded and protruding surface portion or shoulder portion 36. The purpose of this shoulder portion is to provide a uniform contact surface for the engagement of the bridging bar frame member 35 with a spaced but immediately adjacent loading dock surface FIG. 6, in accordance with the advantages of the invention. The hinged flap or ramp member 22, as shown in FIG. 1, is used to span the spaced apart loading surface 26 and the adjacently located loading dock surface as is commonly understood in the practice of the art.

For a more detailed explanation of the preferred embodiment, reference is made to FIGS. 2–6. The loading surface 26 of the platform level 25 is provided with an aperture 32 extending therethrough. A tubular generally circular insert sleeve member 38 is mounted directly beneath the loading surface 26, braced with side angular brace members 39, and is aligned with the aperture 32 for receiving in telescopic fashion the insertable post member 31. The bridging bar frame member 35 is provided with aligned apertures in its top and bottom surfaces, only the top aperture 41 being shown in the drawing, through which the elongated post member 31 can be inserted for further extension into the sleeve member 38. The sleeve member 38 can be conveniently provided with shoulder or flange means (not shown) which serves to limit the extent of insertion of the post member 31 into the sleeve member 38, as is desired to obtain the upward extension of the post member 31 above the loading surface 26 to a sufficient extent or predetermined height to provide for vertical adjustment or movement of the bridging bar frame member 35 with respect to the post member 31. The post member 31 is further provided with a retaining ring member 33 located approximate to its upper extremity to serve to limit the vertical adjustment or movement of the bridging bar frame member 35 with respect to the post member 31.

Figure 5:
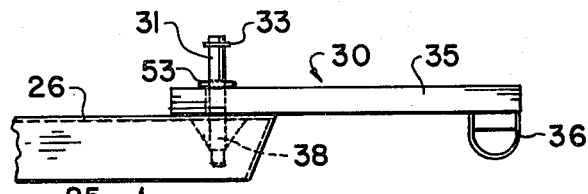
FIG. 5 is another fragmented side view of bridging bar attachment and platform similar to that of FIG. 4, showing the bridging bar attachment extended outwardly from the platform.
Figure 6:
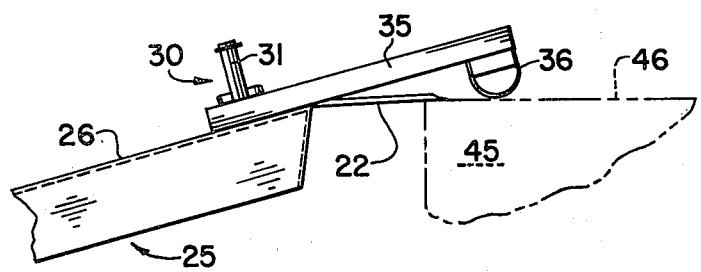
FIG. 6 is still another fragmented side view of bridging bar attachment and platform similar to that of FIG. 5, showing bridging bar attachment engaging a stationary dock side to maintain height adjustment of adjacent end portion of platform.

The distal or free end portion 35a of the frame member 35, that is, the end portion oppositely disposed from the end portion which is pivotally connected to the post member 31, is provided with the rounded and protruding surface or shoulder portion 36. The preferred embodiment thereof is shown to include a generally semicircular contact member 34 extending for the full relative width of the bridging bar frame member 35, and a rectangular bracing plate member 37 preferably placed adjacent to the underside of the frame member 35 for maximum strength. There is shown in dashed lines in FIG. 6, the spaced but adjacent stationary loading dock 45 with its loading surface 46, whereupon the hinged ramp member 22 is rested for facilitating movement of cargo across the ramp member 22 to and from the loading surfaces 26 and 46. The bridging bar frame member 35 is extendable as shown in FIGS. 1, 5 and 6 to engage the fixed loading surface 46 as the platform lift apparatus 20 is being vertically lowered. During the continued lowering of the platform lift apparatus 20, the platform level 25 is lifted from its supporting frame 23 on its non-attached free end portion by the suspension of the bridging bar attachment means 30. The platform level 25 is caused to assume an angular position with respect to its former horizontal plane, as shown in FIG. 6. The rounded surface of the contact member 34 is designed to always provide a uniform bearing contact during angular adjusting movements of the platform level 25.

Figure 3:
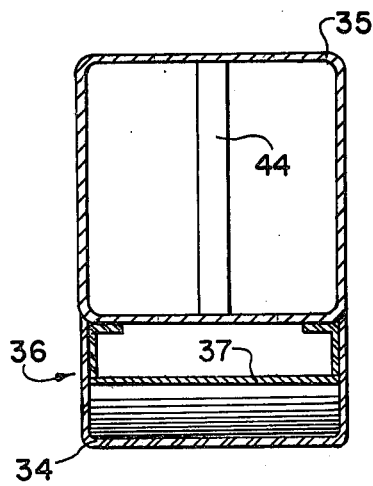
FIG. 3 is a partial sectional isolated view of the bridging bar attachment generally taken along line 3—3 of FIG. 2, omitting a post attachment.

FIG. 3 shows a sectional view of the bridging bar frame member 35 taken generally through the attached rounded shoulder portion 36 wherein the bracing plate member 37 is shown to be attached to both the frame member 35 and the shoulder portion 36. The configuration of the bracing plate member 37 and the base or non-contact portion of the shoulder 34 could be suitably altered to numerous configurations, all of which would be functionally equivalent to and made obvious by the selected and disclosed configurations thereof as shown in the drawing. The bracing bar frame member 35 is shown to be strengthened suitably by providing a pair of bracing rib members 44 approximate to the opposite end portions of the frame member 35, as most clearly shown in FIGS. 2 and 3. The rib members 44 are not extended for the full length of the bridging bar frame member 35.

In accordance with the present invention, the post member 31 is provided with an aperture or opening 51 extending therethrough in the horizontal plane and spaced along the height thereof to be located, after the bridging bar frame member 35 is extended and brought into direct engagement with the loading surface 26, to be immediately above the bridging bar frame member 35. A capturing or restraining pin member 53 is provided to be inserted into the opening 51 and entirely through the post member 31 to comprise first restraining means to maintain the first or extended position of the bridging bar frame member 35 and restrain the same against further vertical movement with respect to the post member 31. Once the pin member 53 is properly inserted into the opening 51, the pin member 53 can be suitably secured in place by use of the wire clamp member 54, as most clearly shown in FIG. 2.

Figure 4:
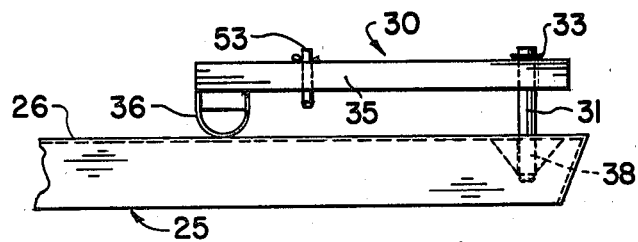
FIG. 4 is a fragmented side view of a bridging bar attachment positioned at rest on a upper adjustable platform forming part of a bi-elevational dock lift.

It is to be noted that the opening 51 in the post member 31 is not available for insertion of the pin 53, except when the bridging bar frame member 35 is extended outwardly from the platform level 25, for the reason that the height dimension of the shoulder portion 36 extending from the loading surface 26 causes the pivotally connected end portion of the bridging bar 35 to be raised vertically on the post member 31 as shown in FIG. 4. The retaining ring member 33 on the post member 31 comprises second restraining means useful to limit the vertical movement of the bridging bar 35 with respect to the post member 31 and aid to maintain the second or retracted position of the bridging bar frame member 35. The pin member 53 is provided to be conveniently stored when not in use in the bridging bar frame member 35 by means of inserting the pin 53 into an opening 55 in the top surface of the bridging bar 35, generally located along the intermediate length thereof. The wire clamp 54 is again useful to limit the extent of insertion of the pin 53, and guards against misplacing or losing the pin 53.

FIGS. 1 and 5 show the bridging bar frame member 35 in its first fixed and restraining position thereof, extending outwardly from the platform level 25 for engagement with the fixed loading dock 45, as shown in FIG. 6. The bridging bar frame member 35 is preferably restrained by the pin 53 to be and remain in direct contact with the adjustable loading surface 26, so as to move angularly therewith. The precipitated angular movement of the bridging bar 35 is easily accommodated by the curvilinear surface of the shoulder portion 36 and a uniform surface bearing contact is provided between the bridging bar 35 and the fixed loading surface 46.

FIGS. 1 and 4 show the bridging bar frame member 35 in its second fixed non-restraining and non-extended position thereof, retracted to extend inwardly of the platform level 25. The contact of the shoulder portion 36 of the bridging bar 35 causes the opposite end portion of the bridging bar frame member 35 to be raised against the restraining and retaining ring member 33. In accordance with the preferred usage of the present invention, the bridging bar attachment means 30 is located on the platform level approximate to each corner of the free end or non-attached portion thereof, and the hinged flap member 22 is located intermediately thereof. It is understood that the opposite end of the platform level 25 is pivotally connected to the scissor frame member 23, and the free end portion is not attached thereto, in accordance with the teachings of the referenced U.S. Pat. No. 4,221,280.

Other alternative equally useful and/or equivalent configurations and mounting arrangements could be doubt be thought of and/or employed to accomplish the intent and purpose of the present invention. It is to be understood that while the present invention has been shown and described with reference to the preferred embodiments thereof, the invention is not limited to the precise forms set forth, and that various modifications and changes may be made therein without departing from the true spirit and scope of the present invention.

What is claimed is:

1. Bridging bar attachment means for use with bi-elevational platform lifts having a platform member which is pivotally attached on one end portion thereof and the opposite end portion thereof being free for angular movement to present desired angular positions of the platform member including in combination post means connectible to the platform level approximate to the free end portion thereof and extending upwardly generally perpendicularly therefrom to a predetermined height, bridging bar frame means being pivotally connected to the post means and extending generally perpendicularly therefrom to define a free end portion thereof, the briding bar frame means including on the free end portion thereof generally rounded and protruding shoulder means having a rounded contact surface thereon, the bridging bar frame means being pivotal with respect to the post means to be selectively positioned in a first extended position extending outwardly from the free end portion of the platform member, first restraining means for restraining the bridging bar frame means against movement with respect to the post means with the bridging bar frame means in the first extended position thereof, the bridging bar frame means alternatively being selectively positioned in a second and non-extending position with respect to the platform member, and second restraining means for restraining the bridging bar frame means against movement with respect to the post means with the bridging bar frame means in the second non-extended position whereby with the bridging bar frame means extended from the platform member, the bridging bar frame means are useful to suspend the free end portion of the platform member from an adjacently spaced vertically offset loading level.

2. The bridging bar attachment means in claim 1 wherein the post means include an aperture extending therethrough, and the first restraining means comprises insertable pin means to be extended through the aperture of the post means for restraining movement of the bridging bar frame means with respect to the post means.

3. The bridging bar attachment means of claim 1 wherein the post means include circumferential retaining ring means approximate to the distal extended free end portion thereof, the ring means comprises the second restraining means for restraining movement of the bridging bar frame means with respect to the post means with the bridging bar frame means positioned in the non-extended position thereof with respect to the platform member.

4. The bridging bar attachment means of claim 1 wherein the bridging bar frame means comprise a generally elongated extension frame member of tubular construction and including on one end portion thereof vertically aligned apertures through which to receive the post means for providing the pivotal connection therebetween.

5. The bridging bar attachment means of claim 4 wherein the extension frame member engages the platform member along a predetermined portion of the elongated length of the frame member and is restrained by the first restraining means to maintain the engagement therebetween with the extension frame member positioned in the first extended position thereof with respect to the platform member.

6. Bridging bar attachment means for use in combination with a vertically adjustable scissor-acting dock lift having a raised platform loading level which is free on one end portion thereof to be separated from the supporting frame structure, comprised in combination of a post member attachable to the platform loading level generally along the free end portion thereof and extending perpendicularly therefrom, a generally elongated bridging bar frame member pivotally connected to the post member on one end portion thereof and extending perpendicularly with respect thereto to define a free end portion of said bridging bar frame member, first restraining means for restraining the bridging bar frame member against pivotal movements with respect to the post member with the bridging bar in a first position extended outwardly from the platform loading level, second restraining means for restraining the bridging bar frame member from being disconnected from the post member with the bridging bar in a second position of non-extension from the platform loading level, and the free end portion of the bridging bar frame member including rounded and protruded surface means for engaging an associated adjacent loading level and maintaining uniform surface contact therewith during movement of the platform loading level with the bridging bar frame member restrained in the first position thereof.

* * * * *